United States Patent [19]

Chalasani et al.

[11] Patent Number: 5,966,582
[45] Date of Patent: *Oct. 12, 1999

[54] METHOD FOR RAPID STIFFENING OF EXTRUDATES

[75] Inventors: Devi Chalasani, Painted Post, N.Y.; Ronald E. Johnson, Tioga, Pa.

[73] Assignee: Corning Incorporated, Corning, N.Y.

[*] Notice: This patent is subject to a terminal disclaimer.

[21] Appl. No.: 08/953,774

[22] Filed: Oct. 17, 1997

Related U.S. Application Data

[60] Provisional application No. 60/029,367, Oct. 28, 1996.

[51] Int. Cl.⁶ .................................. B22F 1/02; B22F 3/20
[52] U.S. Cl. ................................. 419/34; 419/36; 419/67; 264/630; 264/634; 264/638
[58] Field of Search ................................. 419/34, 36, 67; 148/513; 264/623, 630, 634, 638

[56] References Cited

U.S. PATENT DOCUMENTS

| | | | |
|---|---|---|---|
| 4,629,593 | 12/1986 | Groh et al. | 264/634 |
| 4,721,599 | 1/1988 | Nakamura | 419/36 |
| 5,258,205 | 11/1993 | Wu | 427/393.6 |
| 5,427,601 | 6/1995 | Harada et al. | 419/34 |
| 5,487,865 | 1/1996 | Hampton et al. | 419/30 |
| 5,568,652 | 10/1996 | Wu | 419/2 |
| 5,574,957 | 11/1996 | Barnard et al. | 419/67 |
| 5,678,165 | 10/1997 | Wu | 419/41 |

*Primary Examiner*—George Wyszomierski
*Attorney, Agent, or Firm*—L. Rita Herzfeld

[57] ABSTRACT

A method for extruding a stiffer powder mixture at lower extrusion pressure involves providing an aqueous mixture of inorganic powder that can be metal, ceramic, glass, glass ceramic, molecular sieve, and/or carbon, fatty acid the main chain of which has at least 12 carbon atoms, thermally gellable cellulose ether binder, and wax that can be paraffin and/or propylene glycol hydroxystearate, wherein the powder is coated with the fatty acid component. If clay is included in the mixture, it is provided as either calcined or hydrous. The mixture is passed through an extruder and through an extrusion die to produce a green extrudate at an extrusion pressure that is equal to or lower than it would be absent the combination of the fatty acid, the cellulose ether binder, and the wax. The mixture in the extruder and the extrudate are stiffer than without this combination.

8 Claims, No Drawings

METHOD FOR RAPID STIFFENING OF EXTRUDATES

This application claims the benefit of U.S. Provisional Application No. 60/029,367, filed Oct. 28, 1996, entitled "Method for Rapid Stiffening of Extrudates", by Devi Chalasani and Ronald E. Johnson.

This invention relates to a method of extruding highly filled powder mixtures containing a fatty acid, in which a combination of thermally gellable cellulose ether binder, and molten paraffin and/or propylene glycol hydroxystearate wax impart rapid stiffening at lower extrusion pressures to the at the very instant the batch exits the die.

BACKGROUND OF THE INVENTION

Powder mixtures having a cellulose ether binder are used in forming articles of various shapes. For example, metal powder mixtures are formed into honeycombs which are used as substrates in catalytic and adsorption applications, (EHCs). The mixtures must be well blended and homogeneous in order for the resulting shaped body to have good integrity in size and shape and uniform physical properties. The mixtures have organic additives in addition to the binders. These additives can be surfactants, lubricants, and dispersants and function as processing aids to enhance wetting thereby producing a uniform batch.

Distortion of the extrudate can occur during (1) flow through the die and at the die exit, (2) cutting, (3) handling, and (4) drying.

Rapid-setting characteristics are important for maintaining the shape of extrudates. The quicker the extrudate can be solidified after forming, the less chance of the dimensions of the greenware being altered in subsequent cutting and handling steps. This is especially true for a fragile thin-walled or complex shapes such as honeycombs or a product having a large frontal area.

Various techniques have been disclosed for rapid stiffening of such batches. For example U.S. Pat. No. 5,258,205 relates to dipping various rapid setting additives e.g. surfactants, binders and water soluble polymers e.g. polyethylene glycol, at elevated temperatures, e.g. around 70° C. This relatively high temperature makes the process undesirable from an operational and economic standpoint. Also, hancling of polyethylene glycol is difficult because it is very tacky. Other techniques, such as lowering of lubricant and/or water content require use of high mixing torques and extrusion pressures. Radio frequency stiffening techniques require a relatively high capital investment such as in-line shielding at the die exit.

Prior methods such as the above described techniques involve extrusion of soft batches and result in stiffening of the extrusion mixture only well after the extrudate has exited the die and not before or immediately after exiting the die.

There still remains a need for a method of earlier stiffening, such as before and instantaneously upon exiting the die to maximize shape retention of extrudates in subsequent handling, especially for complex structures as honeycombs. The present invention fills this need.

SUMMARY OF THE INVENTION

In accordance with one aspect of the invention, there is provided a method for extruding a stiffer powder mixture at lower extrusion pressure that involves providing an aqueous mixture of inorganic powder that can be metal, ceramic, glass, glass ceramic, molecular sieve, and/or carbon, fatty acid the main chain of which has at least 12 carbon atoms, thermally gellable cellulose ether binder, and wax that can be paraffin and/or propylene glycol hydroxystearate, wherein the powder is coated with the fatty acid component. If clay is included in the mixture, it is provided as either calcined or hydrous. The mixture is passed through an extruder and through an extrusion die to produce a green extrudate at an extrusion pressure that is equal to or lower than it would be absent the combination of the fatty acid, the cellulose ether binder, and the wax. The mixture in the extruder and the extrudate are stiffer than without this combination.

DETAILED DESCRIPTION OF THE INVENTION

The present invention relates to a method of extruding highly filled aqueous inorganic powder mixtures in which the mixture is stiffer as it is being extruded and immediately after it leaves the die than in prior methods. Also, the extrusion pressure is lower than in prior methods. The mixtures are made of inorganic powder which can be metal or free oxide powder, a fatty acid component, wax, and thermally gellable cellulose ether binder. The fatty acid component coats the powder. The rapid stiffening effect is attained by maintaining the temperature of the mixture both while it is in the extruder and as it exits the die, high enough to maintain the wax in a liquid form, and preferably no higher than the gel point of the cellulose ether binder.

The Inorganic Powder

The powders which can be used are any of those that when combined with the thermally gellable organic binder can be shaped into a body.

Typical powders are inorganics such as metal, ceramic, glass ceramic, glass, and molecular sieve, carbon or combinations of these.

The invention is especially suitable for use with metal powders. Metal powder mixtures generally have less water affinity and are less hydrophilic than many other powders, e.g. ceramic mixtures, and in consequence the stiffening effects are therefore more pronounced than with mixtures having more water affinity.

Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758, 272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as e.g., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general the metal and/or metal alloy powders and optionally rare earth oxide powders are mixed in amounts to result in the body having the desired composition. The starting metal powders are iron, cobalt, nickel, chromium, aluminum metals, and special metal powders, if they are to be used. The metal can be supplied in either the unalloyed form or alloyed with one or more of the other metals, or partially unalloyed and partially alloyed. Most typically, however, the iron, when added as the balance, is in the elemental form. The chromium can be elemental or alloyed with aluminum or iron. Chromium-aluminum alloy is preferable. Typically, the aluminum is supplied alloyed with iron and/or chromium for stability. Some typical alloy powders that can be used in formulating the mix to yield a body having some typical compositions of the present invention are Fe—Cr-Al—(Y, lanthanide series elements, Zr, Hf, or Cu) alloy powder, Cr-Al—(Y, lanthanide series elements, Zr, Hf, or Cu) alloy powder, Fe—B, Fe—Si powder, etc.

In general, the powder material is fine powder (in contrast to coarse grained materials) some components of which can either impart plasticity, such as clays, when mixed with a vehicle such as water, or which when combined with the organic binder can contribute to plasticity.

Ceramic, glass ceramic and glass ceramic powders are also meant to include those raw materials that when fired form those phases. By combinations is meant physical or chemical combinations, e.g., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being, for example, about 55% to about 60% mullite, and about 30% to about 45% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, having a particle size of about 7–9 micrometers, and a surface area of about 5–7 $m^2/g$, such as Hydrite MP™, those having a particle size of about 2–5 micrometers, and a surface area of about 10–14 $m^2/g$, such as Hydrite PX™, delaminated kaolinite having a particle size of about 1–3 micrometers, and a surface area of about 13–17 $m^2/g$, such as KAOPAQUE-10™ (K10), calcined clay, having a particle size of about 1–3 micrometers, and a surface area of about 6–8 $m^2/g$, such as Glomax LL. All of the above named materials are sold by Dry Branch Kaolin, Dry Branch, Ga. The clay can be either calcined or hydrous, but not both as a combination of these types would make the batch softer, which is undesirable.

Some typical kinds of talc are those having a surface area of about 5–8 $m^2/g$, such as supplied by Barretts Minerals, under the designation MB 96-67.

Some typical aluminas are coarse aluminas, for example, Alcan C-700 series, such as those having a particle size of about 4–6 micrometers, and a surface area of about 0.5–1 $m^2/g$, e.g., C-701™, fine alumina having a particle size of about 0.5–2 micrometers, and a surface area of about 8–11 $m^2/g$, such as A-16SG from ALcoa. Either hydrous or calcined alumina can be used, but not both at once.

One typical kind of silica is that having a particle size of about 9–11 micrometers, and a surface area of about 4–6 $m^2/g$, such as IMSIL™ sold by Unimin Corporation.

In filter applications, such as in diesel particulate filters, it is customary to include a burnout agent in the mixture in an amount effective to obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Some suitable zeolites are pentasil, such as ZSM-5, Y, such as ultrastable Y, beta, mordenite, X, such as 13X, or mixtures thereof.

The invention is also suited for mixtures that contain activated carbon or carbon precursors, e.g. thermosetting resins, that can later be cured, carbonized, and activated.

The Fatty Acid Component

By fatty acid component is meant the named fatty acids and/or their derivatives, e.g. esters. The fatty acid or derivative must be of high enough molecular weight so as to be hydrophobic or insoluble in water. Some especially suited fatty acids or derivatives are those that have greater than 12 carbon atoms in the fatty acid or main chain. Some examples of these are oleic, linoleic acid, linolenic acid, ricinoleic acid, and or stearic acid.

The Cellulose Ether Binder

The thermally gellable cellulose ether binder contributes to the plasticity of the mixture for shaping into a body. Some typical cellulose ether binders according to the present invention are methylcellulose, hydroxybutyl methylcellulose, hydroxymethylcellulose, hydroxypropyl methylcellulose, hydroxyethyl methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co. Methocel A4M is a methylcellulose binder having a thermal gel point of about 50° C., and a gel strength of 5000 g/cm² (based on a 2% solution at 65° C.). Methocel F4M, F240, and K75M are hydroxypropyl methylcellulose. Methocels F4M and F240 have thermal gel points of about 54° C., and Methocel K75M has a gel point of about 70° C. (all based on a 2% solution in water).

In addition to the above components, the extrusion mixture can contain other water soluble polymers such as polyethylene oxide, guar gum, cellulose ether derivatives which normally do not gel such as hydroxybutylcellulose, hydroxyethylcellulose, hydroxypropylcellulose, ethylhydroxy ethylcellulose, sodium carboxy methylcellulose, etc. Other additives such as polyvinyl alcohol (PVA) can be used if they do not react with the specific powder.

The Wax

During the extrusion operation, the wax must be able to be maintained in a liquid state and preferably at a temperature that does not exceed the gel point of the particular cellulose ether binder that is used. This can be done by providing a low melting wax and exceeding the wax melt point. Another way to provide the wax in a liquid state is to combine it with the fatty acid component so that it dissolves into the fatty acid. This latter technique allows slightly higher melting waxes to be used without heating the mixture to the actual melting point of that wax. Some especially suitable waxes are paraffin, and/or propylene glycol hydroxystearate (PGHS). Propylene glycol hydroxystearate, although it has a melting point of about 53° C., can be utilized at lower temperatures because it can be pre-mixed with the fatty acid, e.g. oleic acid at lower temperatures, as will be seen.

The mixture is carried in an aqueous vehicle which is typically water. The vehicle is present in an amount effective to impart optimum handling properties and compatibility with other components and homogeneity in the mixture and it will vary depending on the type of materials. With water as the vehicle, the content is typically about 6–15 wt. %, and more typically about 6–8 wt. %.

The weight percents of the organic components and vehicle are calculated as superadditions with respect to the non-organic solids by the following formula:

$$\frac{\text{weight of organic component,}}{\text{weight units of inorganic powder}} \times 100$$

One especially advantageous mixture composition that is especially suited to the practice of this invention is made up of about 2% to 4% wax which can be paraffin and/or propylene glycol hydroxystearate, about 0.5% to 2% oleic acid, about 1% to 4% cellulose ether binder which can be methylcellulose, and/or its derivatives, about 2% to an effective amount of water for homogeneity, which is typically about 6–10%, and the balance being Fe—Cr—Al metal powder.

The fatty acid is coated onto the powder particles, and the other mixture components (excluding the vehicle). This can be done by any conventional mixing method that ensures complete coating of the particles. For example, the fatty acid component can be sprayed onto the inorganic powder particles and the other components. Use of a liquid fatty acid allows the coating to be done at room temperature which is preferred. However, if the fatty acid is a solid, e.g. stearic acid, it can be done at the melting point of the fatty acid component. The wax can be blended into the fatty acid and the resulting mixture can be sprayed onto the inorganic powder particles and the other components at the melting point of the wax.

The coated particles are then mixed with the vehicle by any conventional technique that ensures a homogeneous blend. The resulting aqueous mixture can then be extruded into noodles for further homogenization.

Once the mixture is well homogenized, it is passed through an extruder and to an extrusion die.

The extrusion operation can be done using a hydraulic heated ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The shear from the twin screws generates heat necessary to melt the wax.

The extrudates made according to the present invention can have any convenient size and shape and the invention is applicable to all processes in which powder mixtures having a thermally gellable binder are extruded and to the products made therefrom. However, the process is especially suited to production of cellular monolith bodies such as honeycombs. Cellular bodies find use in a number of applications such as catalytic, adsorption, electrically heated catalysts, filters such as diesel particulate filters, molten metal filters, regerator cores, etc.

Some examples of honeycombs produced by the process of the present invention, although it is to be understood that the invention is not limited to such, are those having about 94 cells/cm² (about 600 cells/in²), about 62 cells/cm² (about 400 cells/in²), or about 47 cells/cm² (about 300 cells/in²), those having about 31 cells/cm² (about 200 cells/in²), or those having about 15 cells/cm² (about 100 cells/in ). Typical wall thicknesses are for example, about 0.15 mm (about 6 mils) for about 62 cells/cm (about 400 cells/in ) honeycombs. Wall (web) thicknesses range typically from about 0.1 to about 0.6 mm (about 4 to about 25 mils). The external size and shape of the body is controlled by the application, e.g. in automotive applications by engine size and space available for mounting, etc. Honeycombs having about 15 to about 30 cells/cm$^2$ (about 100 to about 200 cells/in$^2$) and about 0.30 to about 0.64 mm (about 12 to about 25 mil) wall thicknesses are especially suited for diesel particulate filter applications.

Stiffening is critical honeycombs having a large frontal area (typically about 12.7–22.9 cm (5–9") diameter and lower cell density and very thin walls, e.g. $\leq$0.13 mm (5 mils) as such structures are more vulnerable to deformation as they leave the extrusion die. Therefore the rapid stiffening effects of the present invention are especially advantageous for those types of structures.

The resulting extrudate exhibits greater stiffness than the extrudates of prior processes, that is, without the combination of fatty acid coating, binder, wax, and the specific temperature ranges employed.

It is well known that extrusion pressures and torques in the case of twin-screw extruders, can be expected to increase as the batch temperature is raised until the temperature of gelation is approached for the thermally gelling cellulosic ether employed. This gelation temperature is a function both of the particular cellulosic ether selected and its concentration in the aqueous phase. It is also well known that adding water immiscible waxes to such extrusion batches will further increase extrusion pressures and torques if the temperature is below the wax melt point, or decrease extrusion pressure if above the wax melt point. In twin screws the effect on torque is less predictable because of plasticization effects. Even if the wax is above the melt point, torques may not significantly change, or may actually be slightly higher than in the absence of the wax. Extrusion pressure in general can be expected to correlate with batch stiffness, although it can deviate in some cases due to lubricating effects. It is always desirable when extruding cellular bodies to extrude with as high a batch stiffness as possible for a given extrusion pressure. One advantage afforded by the present invention is the finding that some particular waxes when used in conjunction with fatty acid lubricants result in the ability to extrude stiffer batches at equivalent or lower extrusion pressures than the prior art. Due to probable at least partial miscibility between the lubricating fatty acid and the wax, it is not certain to what degree in the extruded batch that the wax is in a solid or liquid state, but results clearly show that an increase in stiffness is observed and that this increase continues to rise as the temperature falls. Not only is the initial stiffness higher than the prior art, but the degree of further increase on cooling to room temperature is also higher. Another finding was that the best results in terms of maximum stiffness at equivalent or lower extrusion pressures was obtained when extrusion was accomplished at a temperature slightly below the thermal gelation point of the cellulosic ether binder employed.

The resulting shaped green extrudate is then dried to remove excess moisture. The drying can be by air or steam. Non electrically-conducting materials can be dried by dielectric drying followed by air drying. For metal bodies, induction drying followed by oven drying (100° C. overnight) is used.

The dried body is then heated or fired to form the final product body according to known methods. The firing conditions of temperature and time depend on the composition and size and geometry of the body, and the invention is not limited to specific firing temperatures and times. For metal bodies, the temperatures are about 1000° C. to 1400° C. in a reducing atmosphere preferably hydrogen. Firing times depend on factors as discussed above but are typically at least 2 hours and typically about 8 hours. For example, in compositions which are primarily for forming cordierite, the temperatures are typically from about 1300° C. to about 1450° C., and the firing times are from about 1 hour to about 6 hours. For mixtures that are primarily for forming mullite, the temperatures are from about 1400° C. to about 1600° C., and the firing times are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours. For a zeolite the temperatures are most advantageously about 700° C. to 900° C. Carbon bodies derived from carbon precursors can be heat-treated by being cured, carbonized, and activated as known in the art.

To more fully illustrate the invention, the following non-limiting examples are presented. All parts, portions, and percentages are on a weight basis unless otherwise stated.

Metal powder composition given in Table 1 was used for the examples.

EXAMPLE 1

A powder composition was made up as given in Table 1. This powder composition, about 2500 g, was coated with 25 g of oleic acid in a Littleford mixer. Aliquots of the coated powder were mixed with cellulose ether binder, wax, and water in a Brabender for about 5–7 min. at about 50 rpm. The waxes tested were paraffin (PW), propylene glycol hydroxystearate (PGHS) diethylene glycol monostearate (DEGMS), and hard ester waxes such as synthetic spermaceti, tallow glyceride (tristearin) and Paracin-1. The cellulose ether binder was methylcellulose (Methocel® A4M), and hydroxypropyl methylcellulose (Methocel® F240) The mixtures were extruded through a capillary rheometer and rods and ribbons were extruded at the melting point of the waxes (45–53° C). The load/deformation (L/D) of an extruded ribbon was the measure of batch stiffness. The L/D was measured using a ribbon sample chamber deformed at a controlled velocity. The higher the L/D, the greater the stiffness. The stiffness measurements along with the specific compositions and batch and extrusion temperatures are given in Table 2 for paraffin and PGHS. The batch stiffness was measured by maintaining the temperature of the L/D apparatus at about 23° C. The L/D was measured in two different ways: (1) cooling the extruded ribbons to room temperature (23° C.) before measuring stiffness. The time lapse between the extrusion and the L/D measurement was about 7–10 min., and (2) maintaining the extruded ribbons at the extrusion temperature by placing a bag containing the ribbons in the same water bath used to control the extrusion temperature. The reason for choosing two different ways of "hot" and "cold" batch stiffness measurements is (1) to determine the maximum attainable stiffness of the extrudate when the wax is completely solidified, and (2) to obtain an estimate of the stiffness of the batch as it exits the die. Both paraffin wax and PGHS batches (cold) showed a significant improvement in L/D (4.20–4.77 kg/mm at lower extrusion pressures (25% lower) compared to the control (1.1–1.36 kg/mm). When the ribbon temperature was maintained at the extrusion temperature and the ribbons were quenched from the extrusion temperature to ambient temperature, further enhancement in stiffness (L/D) was observed for both paraffin and PGHS waxes compared to the cold (room temperature) batches.

DEGMS resulted in ribbons with poor extrusion quality (total loss of batch cohesiveness) at the melting point of the wax.

The extrusion pressures were high for hard waxes such as synthetic spermaceti, tallow glyceride, and Paracin-1.

EXAMPLE 2

To understand the cause of the stiffness enhancement, batches were extruded hot and the L/D apparatus was maintained at the extrusion temperature. Run No. 4 of Table 2 shows that the batches extruded at or above the melting point of the wax were stiffer compared to the control, No. 1, even when the batches were hot. The results showed that the batches extruded were stiff to begin with, and further enhancement in stiffness was achieved by quenching the batch to room temperature (hot ribbons touching the metal surface of the L/D apparatus which is at about 23° C.). While not wishing to be bound by theory, it is believed that a plausible explanation for the observed phenomenon is that at the melting temperature of the wax, stiffening may result from enablement of extrusion at or slightly below the gel point of the cellulose ether binder, while maintaining low pressures due to the lubricating effect of the molten wax. In other words, the batch slips at the extruder wall presumably due to a lubricating layer of molten wax between the batch and the extruder.

EXAMPLE 3

Paraffin wax being less expensive than most of the hard waxes (PGHS), would be desirable to use based on cost alone. However, the magnitude of stiffness observed with PGHS (about 683% improvement in L/D) over the control of Table 2 was significantly higher than paraffin (345%). An attempt was made to blend paraffin wax with PGHS, in order to obtain balance of benefits from cost and magnitude of stiffness. Therefore paraffin was blended with PGHS (50/50 weight parts) with the expectation of further enhancing the stiffness at lower cost. Blending the paraffin wax and PGHS did not have any advantage.

TABLE 1

METAL POWDER COMPOSITION

| Raw Materials | (Parts by Weight) | Density) (g/cm$^3$) | (Volume %) |
|---|---|---|---|
| Cr30Al | 23.3 | 5 | 16.9 |
| Electrolytic Cr | 1.7 | 7.2 | 0.8 |
| Fe20B | 0.3 | 6.1 | 0.1 |
| BASF Carbonyl OM | 74.3 | 7.7 | 34.9 |
| Rhone Poulenc Y203 | 0.5 | 4.9 | 0.4 |
| Emersol 213 (Oleic Acid) | 1 | 0.9 | 4.1 |
| A4M (2%) + F240 (2%) | 4 | 1.4 | 10.4 |
| Water | 9 | 1 | 32.5 |
| Metals (Volume %) | 53.1 | | |

TABLE 2

| Run # | Composition wt. % | | Extrusion & Mixing Temp. (° C.) | Extrusion Pressure Kg | Stiffness Load/Deformation$^2$ kg/mm | |
|---|---|---|---|---|---|---|
| | | | | | Ribbon @ 23° C. | Ribbon @ Extrusion Temp. |
| 1A$^1$ | A4M | 2 | 23 | 90 | 1.36 ± .05$^4$ | |
| | F240 | 2 | | | | |
| | Water | 9 | | | | |
| 1B$^1$ | (Control) | | | 87 | 1.10 ± .06 | |
| 2 | A4M | 1 | 45 | 66 | 4.2 ± .42 | 5.23 ± .05 |
| | F240 | 1 | | | | |
| | Paraffin | 3 | | | | |
| | Water | 6.75 | | | | |
| 3 | F240 | 1 | 53 | 65 | 4.77 ± .25 | 7.28 ± .67 |
| | K75M | 1 | | | | |
| | PGHS | 3 | | | | |
| | Water | 6.75 | | | | |
| 4 | F240 | 1 | 53 | 67 | 5.5 ± .1 | 9.4 ± .5 |
| | K75M | 1 | | | | |
| | PGHS | 2 | | | $^3$3.4 ± .77 | 4.4 ± .23 |
| | Water | 6.75 | | | | |

Compositions contained 1% Oleic Acid
[1]Duplicate extrusions
[2]L/D apparatus @ 23° C.
[3]L/D apparatus @ 53° C.
[4]± indicates standard deviation

TABLE 3

| Composition wt. % | | Extrusion & Mixing Temp. (° C.) | Ribbon Pressure Kg | Stiffness L/D (kg/mm) | | Target Water |
|---|---|---|---|---|---|---|
| | | | | @ 23° C. | @ Extrusion Temp. (° C.) | |
| A4M | 1 | 45 | 67 | 4.12 + .32 | 4.57 + .29 (45° C.) | 6.75 |
| F240 | 1 | | | | | |
| PW | 3 | | | | | |
| F240 | 1 | 53 | 60 | 5.30 + .52 | 8.29 + .29 (57° C.) | 6.75 |
| K75M | 1 | | | | | |

TABLE 3-continued

| Composition wt. % | | Extrusion & Mixing Temp. (° C.) | Ribbon Pressure Kg | Stiffness L/D (kg/mm) @ 23° C. | @ Extrusion Temp. (° C.) | Target Water |
|---|---|---|---|---|---|---|
| PGHS | 3 | | | | | |
| F240 | 1 | 48 | 52 | 2.79 + .39 | 3.56 + .55 | 6.75 |
| K75M | 1 | | | | (48° C.) | |
| PW | 1.5 | | | | | |
| PGHS | 1.5 | | | | | |
| F240 | 1 | 55 | 61 | 2.8 + .27 | 3.4 + .19 | 6.75 |
| K75M | 1 | | | | (55° C.) | |
| PW | 1.5 | | | | | |
| Stearic Acid | 1.5 | | | | | |

Compositions contained 1% Oleic Acid

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for extruding a stiff powder mixture at low extrusion pressure, the method comprising:

a) providing a mixture consisting essentially of inorganic powder selected from the group consisting of metal, ceramic, glass, glass ceramic, molecular sieve, carbon, and combinations thereof, fatty acid component comprising a main chain having at least 12 carbon atoms, thermally gellable cellulose ether binder, and wax selected from the group consisting of paraffin, propylene glycol hydroxystearate, and combinations thereof, wherein the wax is provided in liquid form and at a temperature that is no higher than the gel point of the cellulose ether binder, b) coating the powder with the fatty acid component;

c) adding the aqueous vehicle to the mixture; and d) passing the mixture through an extruder and through an extrusion die at an elevated temperature to produce a green extrudate at an extrusion pressure that is lower than the extrusion pressure that is needed to extrude an equivalent stiffness mixture without the fatty acid pre-coated onto the powder, to produce an extrudate having a stiffness that exceeds its stiffness at room temperature.

2. A method of claim 1 wherein the powder is metal powder comprising iron, chromium, and aluminum.

3. A method of claim 2 wherein the fatty acid component is selected from the group consisting of oleic acid, oleic acid esters, linoleic acid, linoleic acid esters, linolenic acid, linolenic acid esters, ricinoleic acid, ricinoleic acid esters, stearic acid, stearic acid esters, and combinations thereof.

4. A method of claim 2 wherein the cellulose ether binder is selected from the group consisting of methylcellulose, hydroxypropyl methylcellulose, and combinations thereof.

5. A method of claim 2 wherein after addition of said aqueous vehicle said mixture comprises in weight percent based on the inorganic powder, about 2% to 4% of said wax, about 0.5% to 2% oleic acid, about 2% to 4% cellulose ether binder selected from the group consisting of methylcellulose, hydroxypropyl methylcellulose, and combinations thereof, about 6% to 8% water as said aqueous vehicle, with the metal powder comprising Fe, Cr, and Al.

6. A method of claim 1 comprising the additional steps of drying and firing the green extrudate.

7. A method of claim 1 wherein clay is included in the mixture, the clay being provided in a form selected from the group consisting of calcined clay, and hydrous clay.

8. A method for extruding a stiff powder mixture at low extrusion pressure, the method comprising:

a) forming a mixture consisting essentially of Fe—Cr—Al metal powder, oleic acid, methylcellulose, hydroxypropyl methylcellulose, wax selected from the group consisting of paraffin, propylene glycol hydroxystearate, and combinations thereof, at a temperature of about 45° C. to 55° C., b) coating the powder with the oleic acid;

c) adding the aqueous vehicle to the mixture; and d) passing the mixture through an extruder and through an extrusion die at a temperature of about 45° C. to 55° C., to produce a green extrudate at an extrusion pressure that is lower than the extrusion pressure that is needed to extrude an equivalent stiffness mixture without the oleic acid pre-coated onto the powder, to produce an extrudate having a stiffness that exceeds its stiffness at room temperature.

* * * * *